US010275929B2

(12) United States Patent
Jennings et al.

(10) Patent No.: US 10,275,929 B2
(45) Date of Patent: Apr. 30, 2019

(54) APPARATUS AND METHOD FOR APPLYING A TWO-DIMENSIONAL IMAGE ON A THREE-DIMENSIONAL MODEL

(71) Applicant: Creative Edge Software LLC, Dover, DE (US)

(72) Inventors: Amy Jennings, Eton (GB); Stuart Jennings, Eton (GB)

(73) Assignee: CREATIVE EDGE SOFTWARE LLC, Dover, DE (US)

( * ) Notice: Subject to any disclaimer, the term of this patent is extended or adjusted under 35 U.S.C. 154(b) by 0 days.

(21) Appl. No.: 15/645,935

(22) Filed: Jul. 10, 2017

(65) Prior Publication Data
US 2017/0309058 A1 Oct. 26, 2017

Related U.S. Application Data

(63) Continuation of application No. 14/771,553, filed as application No. PCT/GB2014/050694 on Oct. 3, 2014, now abandoned.

(30) Foreign Application Priority Data

Mar. 11, 2013 (GB) .................................. 1304321.1

(51) Int. Cl.
G06T 15/04 (2011.01)
G06T 11/00 (2006.01)
(Continued)

(52) U.S. Cl.
CPC ............ *G06T 15/04* (2013.01); *G06T 11/001* (2013.01); *G06T 15/20* (2013.01); *G06T 17/10* (2013.01);
(Continued)

(58) Field of Classification Search
USPC ........................................................ 345/420
See application file for complete search history.

(56) References Cited

U.S. PATENT DOCUMENTS 5,903,270 A 5/1999 Steven
6,124,858 A 9/2000 Ge et al.
(Continued)

FOREIGN PATENT DOCUMENTS

| CN | 102521852 | 6/2012 |
| EP | 0889437 | 1/1999 |
| WO | WO2014140540 | 9/2014 |

OTHER PUBLICATIONS

Litwinowicz, Peter, Efficient Techniques for Interactive Texture Placement, Proceedings of the 21st Annual Conference on Computer Graphics and Interactive Techniques, 1994, pp. 119-122, New York New York.

(Continued)

*Primary Examiner* — Kimbinh T Nguyen
(74) *Attorney, Agent, or Firm* — Stetina Brunda Garred and Brucker

(57) ABSTRACT

A method and apparatus for applying a two-dimensional image on a three-dimensional model composed of a polygonal mesh. The method comprises generating an adjacency structure for all triangles within the mesh, identifying a triangle within membrane containing the desired center point, calculating spatial distances between the three vertices and desired center checking each triangle edge to see if the distances show an intersection, if a collision is detected add the triangle to the list and iteratively processing all the triangles in the list calculate the spatial data of the single unknown vertex, check the two edges of the triangle to see if the calculated distances show an intersection, if an intersection occurs add this new triangle to the list; transforming (Continued)

into UV-coordinates; and applying the two-dimensional image to the three-dimensional model using the UV-coordinates.

14 Claims, 2 Drawing Sheets

(51) Int. Cl.
*G06T 15/20* (2011.01)
*G06T 17/10* (2006.01)
*G06T 17/20* (2006.01)
*G06T 19/00* (2011.01)

(52) U.S. Cl.
CPC ............ *G06T 17/205* (2013.01); *G06T 19/00* (2013.01); *G06T 2200/21* (2013.01); *G06T 2210/52* (2013.01); *G06T 2219/016* (2013.01)

(56) References Cited

U.S. PATENT DOCUMENTS

| | | |
|---|---|---|
| 7,027,050 B1 | 4/2006 | Dunnett et al. |
| 7,280,106 B2 | 10/2007 | Hong et al. |
| 7,511,718 B2 | 3/2009 | Subramanian et al. |
| 8,654,121 B1 | 2/2014 | Yu et al. |
| 2001/0056308 A1* | 12/2001 | Petrov .................... G06T 17/20 700/98 |
| 2002/0050988 A1* | 5/2002 | Petrov .................... G06K 9/20 345/418 |
| 2006/0227133 A1* | 10/2006 | Petrov .................... G06K 9/20 345/419 |
| 2006/0232583 A1* | 10/2006 | Petrov .................... G06K 9/20 345/419 |
| 2006/0290695 A1* | 12/2006 | Salomie ................. G06T 17/20 345/420 |
| 2008/0225044 A1* | 9/2008 | Huang .................... G06T 17/00 345/420 |
| 2009/0040224 A1* | 2/2009 | Igarashi ................. G06T 19/00 345/427 |
| 2011/0298800 A1 | 12/2011 | Schlichte |
| 2013/0300740 A1* | 11/2013 | Snyder .................... G06F 3/016 345/420 |
| 2016/0012629 A1 | 1/2016 | Jennings et al. |

OTHER PUBLICATIONS

Igarashi T. et al. Adaptive Unwrapping for Interactive Texture Painting, Proceedings of the 2001 Synposium on Interactive 3D Graphics, Mar. 19-21, 2001; pp. 209-216 New York, New York.
The State Intellectual Property Office of the People'S Republic of China, Notice of First Office Action, May 27, 2017, 6 pages, Beijing, China.

\* cited by examiner

APPARATUS AND METHOD FOR APPLYING A TWO-DIMENSIONAL IMAGE ON A THREE-DIMENSIONAL MODEL

CROSS-REFERENCE TO RELATED APPLICATIONS

The present application claims priority to the following applications and is a continuation application of U.S. patent application Ser. No. 14/771,553 filed Aug. 31, 2015, which claims priority to PCT International Application No. PCT/GB2014/050694 filed on Oct. 3, 2014, which claims priority to British Patent Application No. GB1304321.1 filed Mar. 11, 2013, the entirety of the disclosures of which are expressly incorporated herein by reference.

STATEMENT RE: FEDERALLY SPONSORED RESEARCH/DEVELOPMENT

Not Applicable

BACKGROUND

This invention relates to an apparatus and method for applying a two-dimensional image on a three-dimensional model. More specifically, but not exclusively, this invention relates to applying a label on a three-dimensional model.

In product development, the visual appearance of the product is an important part of the marketing strategy. Accordingly, developers typically use computer editing suites to design their packaging. In some industries, containers for products are manufactured separately to the brand material, and the brand materials are subsequently fixed to the container. This is common practice in, for example, the drinks industry, in which bottles are manufactured to contain the product, and a label is produced separately and applied to the bottle.

Separate computer editing suites exist for creating the label and creating a model of the bottle. To visualize the label on the bottle, a UV map of the model is created and the label is applied as a texture. This is computationally expensive and also requires a lot of user intervention to ensure the label is applied correctly. This leads to a significant delay for the computer to render the label onto the model. Accordingly, the label cannot be placed on the bottle and moved in real-time, as the processing requirements outweigh the processing power available.

It is therefore desirable to alleviate some or all of the above problems.

BRIEF SUMMARY

According to a first aspect of the invention, there is provided a method of applying a two-dimensional image to a three-dimensional model, the three-dimensional model composed of a polygonal mesh having a plurality of vertices, the method comprising the steps of: identifying a first point corresponding to a vertex of the plurality of vertices; identifying a second point corresponding to a vertex of the plurality of vertices and proximal to the first point; calculating spatial data between the second point and the first point; iteratively identifying successive points, wherein each successive point corresponds to a vertex of the plurality of vertices and is proximal to a previously identified point, and calculating spatial data between each successive point and the previously identified point, until a stop point is identified, the stop point being a point outside the boundary of the two dimensional image; transforming the points and spatial data into UV-coordinates; and applying the two-dimensional image to the three-dimensional model using the UV-coordinates.

The present invention provides a method which may extract UV-coordinates for a particular area of the three-dimensional model, corresponding to the area on which the two-dimensional image is to be applied. Accordingly, the computational power required to apply the two-dimensional image is significantly reduced, as the conventional step of UV-mapping the entire model is not carried out.

On a computing apparatus adapted to carry out the method of the present invention, the user may therefore select a first point in an area on the three-dimensional model to apply the two-dimensional image, and the processor extracts spatial data from that area until it identifies a point on the model being a greater distance from the first point than the distance from the centre to the boundary of the two-dimensional image. As the processing power required has been reduced significantly, the two-dimensional image may therefore be applied to the three-dimensional model and displayed on the computing apparatus' display device in real time. This also allows the user to 'drag' the two-dimensional image across the three-dimensional model, i.e. selecting successive first points on the model, and the processor may apply the two-dimensional image to the model on the fly.

The method may further comprise the step of generating a single three-dimensional model from a plurality of three-dimensional models to form a membrane, wherein the first point is on the membrane. The present invention may therefore apply the two-dimensional image to the membrane enveloping the models. The membrane may contain most or all the vertices of the three-dimensional model, or in the case of a plurality of three-dimensional models, each representing various parts of a complex product, the membrane may contain most or all the vertices of each three-dimensional model.

The method may further comprise the step of applying a smoothing technique to the membrane. Thus, any sudden changes in curvature on the membrane (e.g. due to a gap in the membrane) may be smoothed over. Accordingly, the two-dimensional image may then be applied in a real-life manner. For example, in the case of a label being applied to a three-dimensional model, the label may be applied to the model such that it passes over the gap, in a similar manner to real-life.

A computer program product comprising computer executable code which when executed on a computer may cause the computer to perform the method of the first aspect of the invention.

According to a second aspect of the invention, there is provided a computing apparatus comprising a processor arranged to apply a two-dimensional image to a three-dimensional model, the three-dimensional model composed of a polygonal mesh having a plurality of vertices, the processor configured for: identifying a first point corresponding to a vertex of the plurality of vertices; identifying a second point corresponding to a vertex of the plurality of vertices and proximal to the first point; calculating spatial data between the second point and the first point; iteratively identifying successive points, wherein each successive point corresponds to a vertex of the plurality of vertices and is proximal to a previously identified point, and calculating spatial data between each successive point and the previously identified point, until a stop point is identified, the stop point being a greater distance from the first point than the distance from an outer edge to the boundary of the two-dimensional image; transforming the points and spatial data into UV-coordinates; and applying the two-dimensional image to the three-dimensional model using the UV-coordinates.

The computing apparatus may further comprise a display device, wherein the processor is configured to cause the display device to display the three-dimensional model including the applied two-dimensional image.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
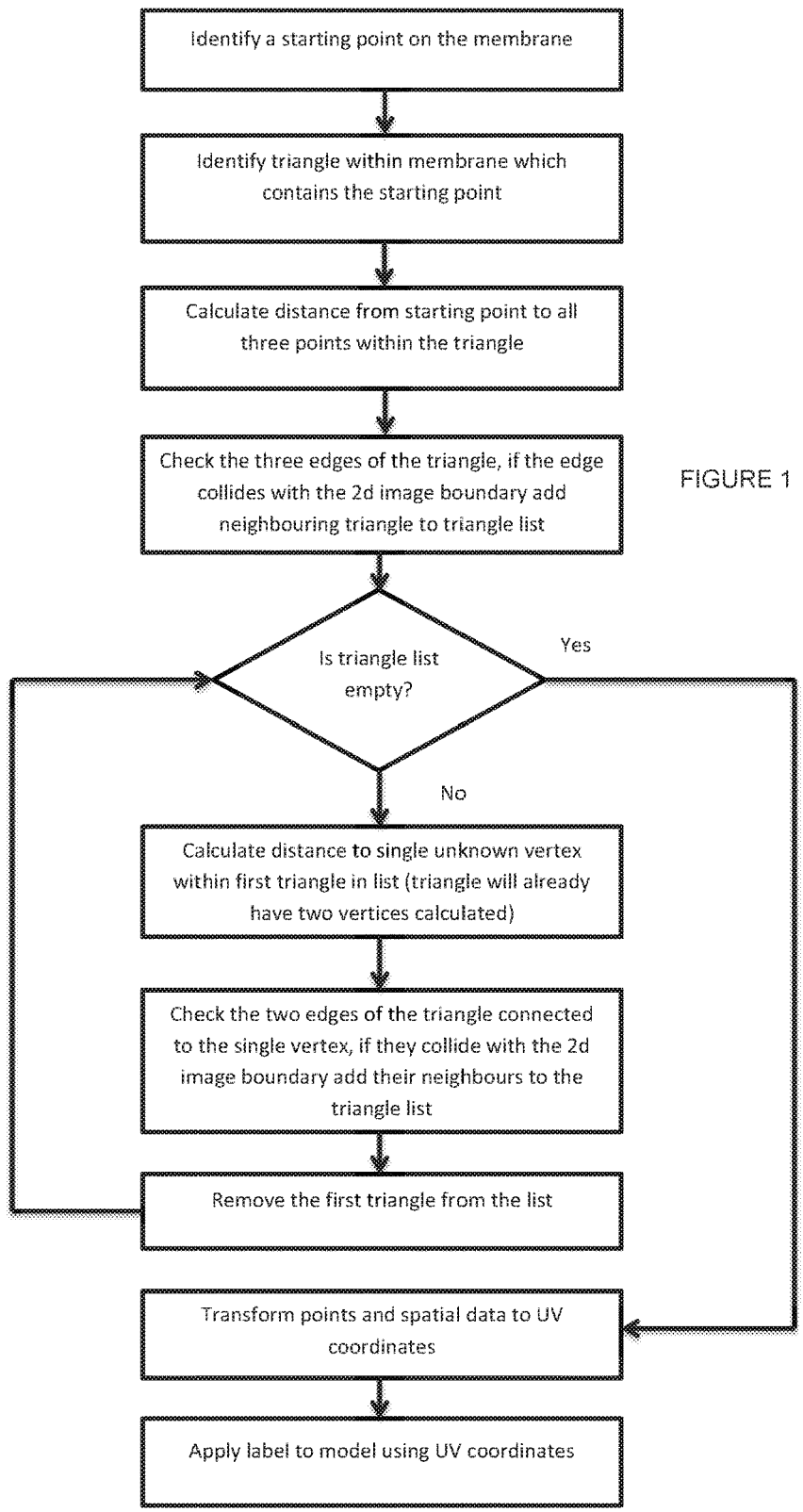
FIG. 1 is flow diagram representing an embodiment of a method of the present invention.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

An embodiment of a method of applying a two-dimensional image to a three-dimensional model in a virtual environment will now be described with reference to FIG. 1. The embodiment will detail an example of placing a label (the two-dimensional image) onto a bottle (the three-dimensional model), but, on reviewing the following description, the skilled person will understand that the method may be applied to any type of two-dimensional image being placed on a three-dimensional model.

As an initial step, a first image file representing a label is created. The first image file may be created in a suitable graphics editing computer program, such as Adobe Illustrator, and consists of a two-dimensional image representing a label (and shall hereinafter be referred to as the "label"). In this embodiment, the label is rectangular and includes a graphical portion enveloped by cutting lines.

As a further initial step, a first model file representing a bottle is created. The first model file may be created in any suitable three-dimensional modelling software, such as 3DS Max or AutoCAD. The first model file consists of a three-dimensional representation of a bottle (and shall hereinafter be referred to as the "bottle"), defined by a triangular mesh. The skilled person will understand that the triangular mesh represents an outer surface of the bottle, and is a non-UV mapped model.

The triangular mesh is used to create a set of data which records the adjacency information of all the triangles within the mesh, in one embodiment a structure such as a half-edge data structure could be used. This allows traversal of the mesh starting from a single point on the mesh. This is labelled as the membrane which consists of a set of triangles with adjacency information.

As explained in more detail below, a plurality of triangular meshes may be merged together (such as one representing a bottle and another representing a bottle cap).

In this embodiment, a single membrane which includes the form of both the cap and bottle is created, this is achieved by starting with a simple shape which encompasses both cap and bottle which is then shrunk to the form of the bottle and cap combined. This single mesh is then used to generate a membrane which is used to place the 2D label on both bottle and cap.

In this embodiment, a 'smoothing' operation is applied to the membrane. Various smoothing techniques may be used, such as Laplacian polygon smoothing (however, the skilled person will understand that other smoothing techniques may be used). This technique ensures that the membrane closely follows a real-life surface that the label will be applied to. For example, if the bottle contained a small gap, the membrane may be smoothed such that it passes over the gap without any change in curvature. This closely represents how the real-life label would be applied to the real-life bottle, as the real-life label would simply be pasted over the gap without any change in curvature.

The label is then applied to the membrane using the following algorithm. As a first step, an initial point of reference is taken as the centre of the label. A collision routine is used to correlate the centre of the label with an initial hit point on the triangle mesh. The initial hit point may be any arbitrary point on the triangle mesh.

In a next step of the algorithm (as shown in FIG. 1), the triangle containing the starting point on the membrane is chosen. The starting point is determined as a point on the membrane which is closest to the initial hit point on the triangular mesh. The distance between this point (horizontal and vertical) and each of the three vertices in the starting triangle is calculated and stored, then each of the three neighbouring triangles is added to a set of triangles to be processed. An iterative process is then employed in the following manner. For each of the triangles in the triangle list, calculate the distance between the vertex in which the distance to the starting point is known and the vertex whose distance is still to be calculated, and store this distance. This distance is calculated using geodesic techniques. Check the remaining two edges of the triangle to see if the 2D coordinates of the triangle intersect the boundary rectangle of the two dimensional label. If an edge does intersect then add the triangle neighbour which uses that edge to the list of triangles to process. The process is run in an iterative manner until there are no more triangles within the list to process.

If the 2D label is likely to overlap itself, the process can be split so that the label is processed as two separate labels; the processing order defines the overlap direction.

In one embodiment, an additional 2D rotation can be applied to all the calculated distances, which would have the effect of rotating the label around the centre point.

The skilled person will understand that this process results in a data set containing a set of points on the membrane and a set of distances (horizontal and vertical) between each point in the set of points on the membrane and the starting point. The data set may then be converted into normalized UV coordinates using a transform. For example, the distances are stored as vectors from the starting point to each point, and are converted to UV coordinates by a translation by 0.5 and scaled to the particular height and width of the label.

The normalized UV coordinates may then be used to apply the label to the bottle. That is, the label may be treated as a texture which may then be correlated with the UV coordinates. Accordingly, a plurality of points within the label may be correlated with particular UV coordinates, such that the label may then be placed on the bottle in the virtual environment.

The skilled person will understand that the process is suitable for applying a two-dimensional image onto any three-dimensional model. The three dimensional model extracts UV coordinates for only a part of the three-dimensional model that the label is to be applied to, and thus reduces the computational power required for prior art techniques which involve a fully mapped UV model. The two-dimensional image may be applied to any portion of the three-dimensional model, and the algorithm detailed above applies the centre of the label to a starting point on the membrane in that portion and extracts the UV coordinates from the membrane of the surrounding area.

The skilled person will also realise that by reducing the computational power required to apply the two-dimensional image to the three-dimensional model, the image may be applied in real-time. That is, the user may slide the image across the membrane of the three-dimensional model and the computational power required is reduced to the point that the image may be applied to the three-dimensional model "on-the-fly".

As noted above, a plurality of triangular meshes may be merged together. In this manner, a label may be applied to a complex product (i.e. an object having multiple constituent parts, such as a bottle and bottle cap). Next, a smoothing operation may be applied to the membrane to smooth any gaps or grooves between the parts of the complex product to ensure the label is applied appropriately.

In the above embodiments, the three-dimensional model consists of one or more triangular meshes to which a single membrane is generated. The skilled person will understand that any form of polygonal meshed model would be appropriate for the present invention. Furthermore, the skilled person will understand that the application of a membrane is preferable as it allows the user to apply a smoothing technique such that the two-dimensional image is applied in a real-life manner. However, the smoothing step is non-essential. For example, the algorithm to extract the UV coordinates may be based on the vertices of the triangular mesh rather than points of a smoothed membrane.

In the above embodiment, a label is applied to a model of a bottle. However, the skilled person will understand that the method of the present invention is suitable for applying any two-dimensional image to any three-dimensional model. For example, the method would be suitable for applying graphics to the bodywork of a vehicle in a virtual environment.

Figure 2:
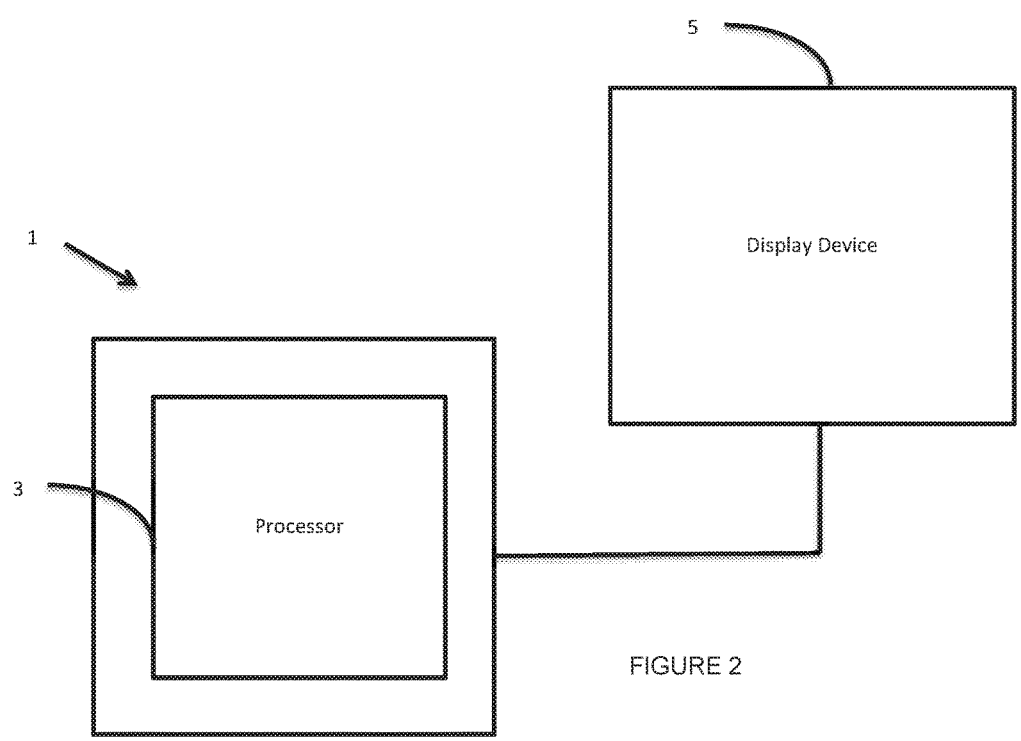
FIG. 2 is a schematic diagram illustrating a computing apparatus configured to carry out the steps of the method of FIG. 1.

The method of the present invention described above may be implemented on a computing apparatus 1, such as a personal computer or mobile computing device (e.g. a tablet). As shown in FIG. 2, the computing device 1 includes a processor 3 configured for implementing the method of the present invention, and a display device 5 configured for displaying the three-dimensional model including the applied two-dimensional image.

The skilled person will understand that any combination of elements is possible within the scope of the invention, as claimed.

The invention claimed is:

1. A method of applying a two-dimensional image to a three-dimensional model in a virtual environment, the three-dimensional model composed of a polygon mesh having a plurality of vertices, the method comprising the steps of:
   creating a membrane by starting with a simple shape for the three dimensional model then shrinking the shape to the form of the three-dimensional model;
   generating an initial adjacency structure for all triangles within the polygon mesh;
   identifying a first triangle within the membrane which contains a desired centre point of the two-dimensional image, the starting point being a point on the membrane which is closest to the initial hit point on the triangular mesh;
   calculating horizontal and vertical spatial distances between the three vertices of the first triangle and desired centre point of the two-dimensional image;
   checking each edge of the first triangle to see if the calculated distances show an intersection on the two-dimensional image, and if a collision is detected adding a new triangle neighbour which neighbours the first triangle, to a list of triangles to process;
   iteratively processing each of the triangles in the list, until the list is empty by:
   (a) calculating the spatial data of the single unknown vertex within the triangle being processed;
   (b) checking the two edges of the triangle connected to the said single unknown vertex to see if the calculated distances show an intersection with the two-dimensional image, and;
   (c) if an intersection occurs adding this new triangle neighbour to the triangle list once empty, transforming the vertices of the triangles and spatial data into UV-coordinates; and
   applying the two-dimensional image to the three-dimensional model using the UV-coordinates.

2. A method as claimed in claim 1, further comprising the step of applying a smoothing technique to the membrane.

3. A method as claimed in claim 1, wherein the three-dimensional model is composed of a plurality of polygonal meshes and the membrane is applied to the plurality of polygonal meshes.

4. A method as claimed in claim 1, further comprising providing a display device, and causing the display device to display the three-dimensional model including the applied two-dimensional image.

5. A computer program product comprising computer executable code which when executed on a computer causes the computer to apply a two-dimensional image to a three-dimensional model in a virtual environment, the three-dimensional model composed of a polygon mesh having a plurality of vertices, the computer program product being configured for:
   creating a membrane by generating an initial adjacency structure for all triangles within the polygon mesh;
   identifying a first triangle within the membrane which contains a desired centre point of the two-dimensional image;
   calculating horizontal and vertical spatial distances between the three vertices of the first triangle and desired centre point of the two-dimensional image;
   checking each edge of the first triangle to see if the calculated distances show an intersection on the two-dimensional image, and if a collision is detected adding the triangle which neighbours the first triangle to a list of triangles to process;
   iteratively processing each triangle in the list until the list is empty by:
   (a) calculating the spatial data of the single unknown vertex within the triangle being processed;
   (b) checking the two edges of the triangle connected to the said single unknown vertex to see if the calculated distances show an intersection with the two-dimensional image; and;

(c) if an intersection occurs adding this new triangle neighbour to the triangle list once the list is empty, transforming the points and spatial data into UV-coordinates; and applying the two-dimensional image to the three-dimensional model using the UV-coordinates.

6. A computer program product as claimed in claim 5, further configured for applying a smoothing technique to the membrane.

7. A computer program product as claimed in claim 5, wherein the three-dimensional model is composed on a plurality of polygonal meshes to form the membrane.

8. A computer program product as claimed in claim 5, further comprising a display device, wherein the processor is configured to cause the display device to display the three-dimensional model including the applied two-dimensional image.

9. A method of applying a two-dimensional image to a three-dimensional model in a virtual environment, the three-dimensional model composed of a polygonal mesh having a plurality of vertices, the method comprising the steps of:

identifying a first point corresponding to a vertex of the plurality of vertices;

identifying a second point corresponding to a vertex of the plurality of vertices and proximal to the first point;

calculating horizontal and vertical spatial data between the second point and the first point;

iteratively identifying successive points, wherein each successive point corresponds to a vertex of the plurality of vertices and is proximal to a previously identified point, and calculating spatial data between each successive point and the previously identified point, until a stop point is identified, the stop point being a point outside the boundary of the two dimensional image; and transforming the first point, second point, successive points, stop point and the respective spatial data of these points into UV-coordinates; and applying the two-dimensional image to the three-dimensional model using the UV-coordinates.

10. A method as claimed in claim 9, further comprising the step of applying an isosurface to the polygonal mesh to form a membrane, wherein the first point is on the membrane.

11. A method as claimed in claim 10, further comprising the step of applying a smoothing technique to the membrane.

12. A method as claimed in either claim 10, wherein the three-dimensional model is composed on a plurality of polygonal meshes and the isosurface is applied to the plurality of polygonal meshes.

13. A method as claimed in claim 9, wherein the stop point is a greater distance from the first point than a radius of a bounding circle for the two-dimensional image.

14. A method as claimed in claim 9, further comprising providing a display device, and causing the display device to display the three-dimensional model including the applied two-dimensional image.

* * * * *